Aug. 21, 1962 G. A. GIANNUZZI 3,049,991

SERIAL NUMBERING PRINTER

Filed June 30, 1959 7 Sheets-Sheet 1

INVENTOR.
GEORGE A. GIANNUZZI

BY Melvin P. Williams

AGENT

Aug. 21, 1962 G. A. GIANNUZZI 3,049,991

SERIAL NUMBERING PRINTER

Filed June 30, 1959 7 Sheets-Sheet 4

SERIAL NUMBERING PRINTER

Filed June 30, 1959 7 Sheets-Sheet 5

Aug. 21, 1962 G. A. GIANNUZZI 3,049,991

SERIAL NUMBERING PRINTER

Filed June 30, 1959 7 Sheets-Sheet 6

Aug. 21, 1962 G. A. GIANNUZZI 3,049,991

SERIAL NUMBERING PRINTER

Filed June 30, 1959 7 Sheets-Sheet 7

3,049,991

SERIAL NUMBERING PRINTER

George A. Giannuzzi, Vestal, N.Y., assignor to International Business Machines Corporation, New York, N.Y., a corporation of New York Filed June 30, 1959, Ser. No. 824,089
16 Claims. (Cl. 101—93)

This invention relates to printing, and more particularly to record card printing machines for printing a series of record cards with numbers in a sequence.

In the processing of data by means of record cards having manifestations of significant data therein, it is frequently desirable to print successive cards in a group with increasing numbers in a sequence. This may be effected by having control indicia in each controlling record governing the printing of each card as in a record card interpreting or end-printing machine; a printing machine of this type is described in my copending application, Serial No. 783,779, now U.S. Patent No. 2,966,114, Data Translating and Printing. Alternatively, serial numbering may be accomplished automatically by increasing the value of the printed number by one upon the sequential printing of each card. This sort of serial numbering frequently comprises an accumulator separate from the printing means, and a complicated control scheme for controlling the accumulation according to the characters printed, and conversely, for controlling the printing according to the accumulation. The accumulator counts the cards printed, and supplies a data signal (similar to the data signal supplied by the sensing brushes in an interpreter) for operating the printing mechanism. The printing mechanism is therefore subject to control by signals external from it, and an indication of each card being printed must be sent to the accumulator. It takes time and requires additional mechanism to provide a printer with serial numbering of this type.

It is a primary object of this invention to provide a simplified serial numbering device which requires a minimum of control function mechanism.

Another object of this invention is to provide a serial numbering printer which requires a minimum of operating time.

A further object of this invention is to provide a serial numbering printer in which the printer control mechanism is capable of automatically printing successive numbers in a sequence without external control signals; accordingly, this invention provides mechanism for controlling the actual printing of numbers which recognizes the last number printed and alters its condition in order to print a subsequent number.

Prior serial numbering machines are frequently of such a limited design as to preclude any other form of printing control. It is another object of this invention to provide a serial numbering machine in which record controlled printing may also be selectively effected.

In the aforementioned copending application there is described one embodiment of a printing machine which operates on the random principle. In that embodiment there is a single row of type placed along the line on which the record is to be printed, there being one character-bearing type bar, similar to those used in typewriters, for each character selectable to be printed; any of the possible characters can be printed in any of the printable positions on the record. The record card is printed along a line parallel with the motion of the card as it is being sensed; as the record continuously moves longitudinally along the row of type bars, a signal indicating that a particular character is to be printed will actuate the related type bar at the exact time that the print position in which that particular character is to print is moving past that type bar.

In order to reduce the amount of mechanism employed and to increase the card rate of printing, the shortest possible operational card feeding path is used, and printing is controlled directly by the record sensing means. The spacing of the printed characters is therefore a function of the speed at which the card passes the type members and the frequency of type bar operation. Since the card moves past the sensing means at the same speed at which it moves past the printing means, direct printing would result in having the characters spaced the same as the control data indicia, which are uniformly distributed on the card. In standard record cards, the data spacing may not be correct for printed characters. For instance, the well-known IBM card has eighty columns of twelve index point positions; the spacing of the columns (about .088 inch) is too close for printed characters in many applications; the spacing of the index points (about .25 inch) is too wide for most printing applications. The readability and asthetic appearance of type printed on a record card is improved by having the printed characters clustered together at an intermediate spacing, for instance at intervals of about two tenths of an inch. Thus printing would have to be done at a lower rate than sensing when reading the card column by column and printing in a row parallel to the long dimension of the card (called "interpreting"); similarly, the printer would need to be operated at a higher frequency when sensing the index point positions digit by digit and printing across the end of the card (called "end-printing"). In that embodiment, a cycle-point conversion device is provided to permit printing at a different frequency than sensing. In order to achieve the advantages of high speed in-flight printing with cycle point conversion and automatic serial numbering, it is necessary for the serial numbering to be compatible with cycle point conversion; and to effect serial number printing identical in appearance with record controlled printing in the same machine, the printer control means must be capable of serial numbering or interpreting at the same frequency.

Wherefore it is another object of this invention to provide a serial numbering printer in which the printing control means is compatible with the random printing principle. It is a further object to provide a random printer serial numbering control means which is effective to print at frequencies different from those at which record cards may be sensed. It is still another object of this invention to provide a record card printer in which record controlled random printing of record cards with cycle point conversion may be automatically intermixed with serial numbering of cards in the same group.

In serial numbering machines of prior design, the columns of the accumulator to the left of the digits being printed must be held blank, or set at zero with suppression of unwanted zeros by the printing means. In record controlled printing, zeros which are punched in cards for reliability checking purposes are frequently suppressed by the printing means so that only significant digits are present.

It is a further object of this invention to provide a serial numbering printer which is compatible with zero suppression. It is another object to provide a serial numbering printer in which the suppression of non-significant digits is automatically provided in the printer control means. Still another object is to provide a combined record controlled and automatic serial numbering printer in which the suppression of non-significant digits developed by the serial numbering control means is effected by the same means that suppress redundant zeros punched in controlling records.

A still further object is to provide an automatic serial numbering and record controlled printer combination in which the basic mechanism controls both record controlled printing and serial numbering, with minimum of mechanism and operating time resulting therefrom.

In order to clarify the several features of this invention, an embodiment thereof adapted to the end-printing embodiment of applicant's copending application will be described.

The foregoing and other objects, features and advantages of the invention will be apparent from the following more particular description of a preferred embodiment of the invention, as illustrated in the accompanying drawings.

CONTENTS

| | Column |
|---|---|
| End Printing and Serial Numbering Combined Printer (FIG. 1) | 3 |
| Type Bars (FIG. 2) | 5 |
| Delay Device With Serial Number Advance (FIG. 3) | 5 |
| Operation and Timing of End Printer (FIGS. 4 and 5) | 6 |
| Operation and Timing of Serial Numbering Printer (FIGS. 6 and 7) | 10 |
| Summary | 15 |

*End Printing and Serial Numbering Combined Printer*

One embodiment of the invention will now be briefly described with reference to FIG. 1, which is similar to and in which all like parts bear the same reference numbers as FIG. 6 of the aforementioned copending application. In the embodiment shown in FIG. 1, the card feed, type bar assemblies, commutators and zero suppression are the same as in the device of FIG. 6 of the copending application.

Figure 1:
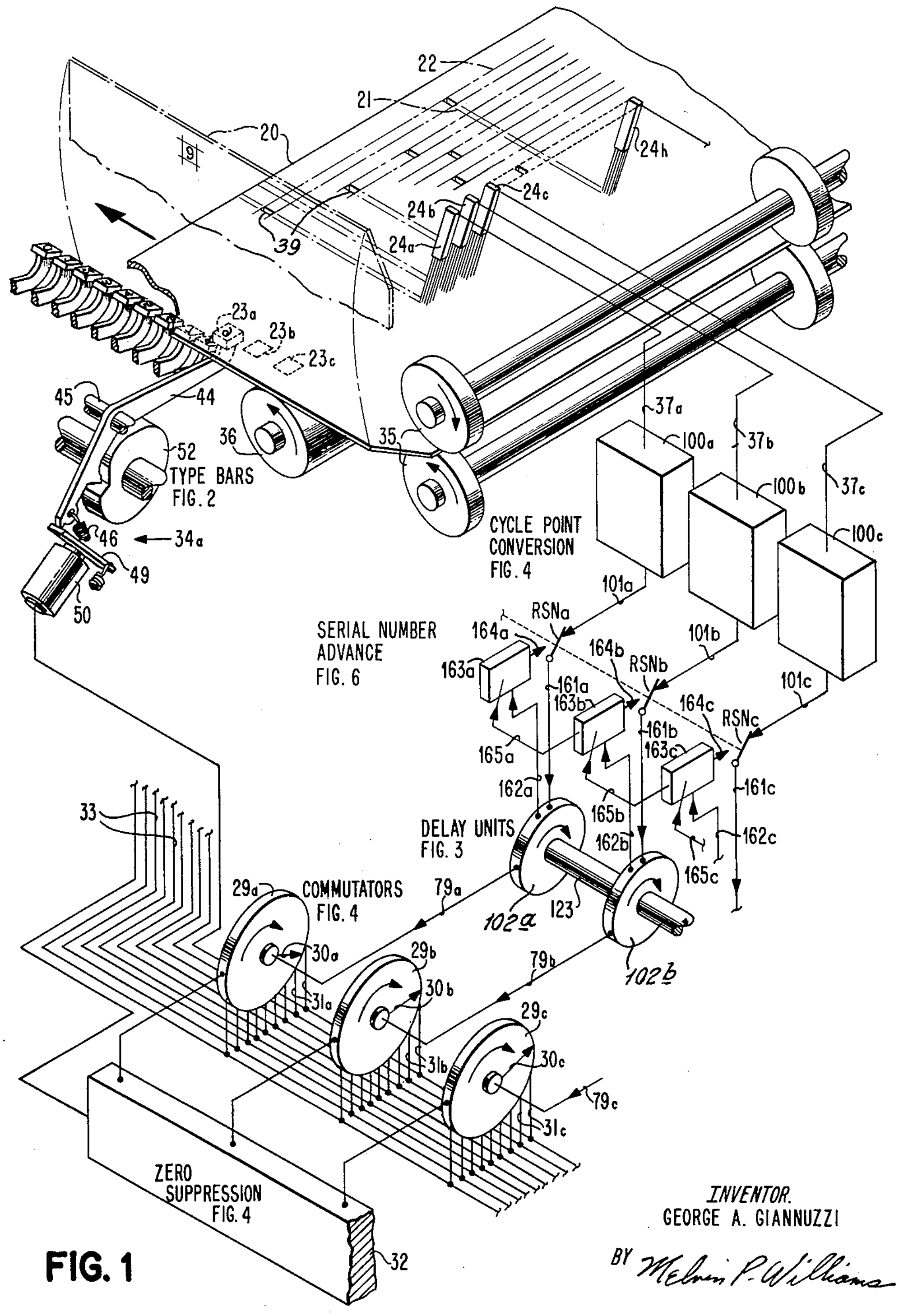
FIG. 1 is a simplified semi-schematic diagram of a device for random end printing and/or automatic serial numbering of a record card with cycle point conversion.

In FIG. 1, a record card 20 of the well-known IBM type has 80 columns 21 of twelve index point positions each. The index point positions are aligned in rows 22; each row corresponds to a digit value or to a control value. The digit rows are parallel to the long dimension of the card and are arranged from one long edge to the other in the following order: 9, 8, 7, . . . 2, 1, 0, X, 12. The "0" may be used to represent a control value with the "X" and the "12," as well as to denote the numeral "zero"; in this embodiment, the "0" is used as a numeral. The record card 20 is fed face down. "9" edge first by a pair of feed rollers 35 (from right to left in FIG. 1). The rows of index point positions 22 pass beneath each of eight brushes 24 in the following order: 9, 8, 7, . . . 2, 1, 0. Each brush 24*a*, 24*b*, . . . 24*h* senses the holes 39 in a corresponding one of eight columns 21*a*, 21*b*, . . . 21*h*, and the data sensed is printed on the card in corresponding print positions 23*a*, 23*b*, 23*c*, etc. Individual "type bars" 44, each having a single character similar to those used in typewriters, are arranged in a row parallel to the card motion so that the print positions 23 move successively past each type bar in sequence; the "9" type bar is passed first, then the "8," and the "0" is passed last; the highest order print position 23*a* passes the type first, and the lowest order print position 23*h* passes the type last. Thus each print position is presented in succession to successively lower numbered type bar; selection of type may therefore be made by swinging the correct type bar (by type bar mechanism 34*a*) at a time when the position to be printed with the corresponding character is passing over that type bar. Since the order in which the various print positions will be printed is determined by which character is to be printed thereon, the order varies from card to card; this form of type operation is called "random printing."

Some sort of conducting medium is needed to sense the passing of a brush 24 through a hole 39. It has long been standard to provide a rotating brush contact roller 36 for contact with the brushes; longer life and more reliable operation are achieved in that way. To preserve the advantages of individual brushes 24 and a common roller 36, it is necessary to arrange the brushes for the several columns in a row perpendicular to card motion; this results in all digits of the same value (for instance all "9's" or all "2's") being sensed simultaneously in each of the columns. Without considering the exact spacing of printed characters, the highest order print position 23*a* could be printed directly from the corresponding brush 24*a*, since the data is sensed by the brushes in the same order as that in which printing takes place. However, since the successively lower ordered print positions appear above each type bar one additional print-time later, there must be introduced one additional print-time of delay for each order lower in the sequence of print positions in which the corresponding print position is disposed. That is, position 23*b* is one print-time delayed, position 23*c* is two print-times delayed . . . position 23*h* is seven print-times delayed. Furthermore, some time delay is required to move the card from the place where the brushes are located to a place where there is sufficient mechanical space to locate the printing mechanism. This space is not critical and can be varied to suit design expediency. It was previously mentioned that in order to get the proper spacing of end printed numbers, it was necessary to print the card at a faster rate than that at which the punched holes are sensed. In this embodiment the standard punched hole reading of 16 holes per cycle is maintained, and printing is effected at a rate corresponding to 20 subcycle points per cycle. The conversion from the lower reading frequency to the higher printing frequency is effected in "cycle point conversion" circuits 100 by storing the punched hole information briefly, and then reading it out of storage by means of pulses emitted on a 20-point basis. This 20-point storage output is fed into rotary "delay units" 102 where it is given a fixed delay of two subcycles, or print-times, to account for card motion from the brush and roller area of the machine to an area where there is room to locate the type bars, and an additional fixed delay of one print-time in each successively lower order column to account for random printing. The rotors 30 distribute the delay unit outputs to the correct type bar, and are rotating synchronously and in the same delay relation as their corresponding delay units. The rotary delay units are designed to allow automatic stepping of the values stored therein to effect serial numbering; when serial numbering, the sensing brushes and cycle point conversion circuits are rendered ineffective to control the delay units by switching means RSN, which units are then controlled by themselves and simple carry circuits 163. Shown at the bottom of FIG. 1, the "zero suppression" circuits pass to the print magnets only significant zeros; zeros punched in a card for checking purposes are blocked, and do not print. The details of the several parts and the timing of the end-printer are presented more fully in succeeding sections.

*Type Bars*

Figure 2:
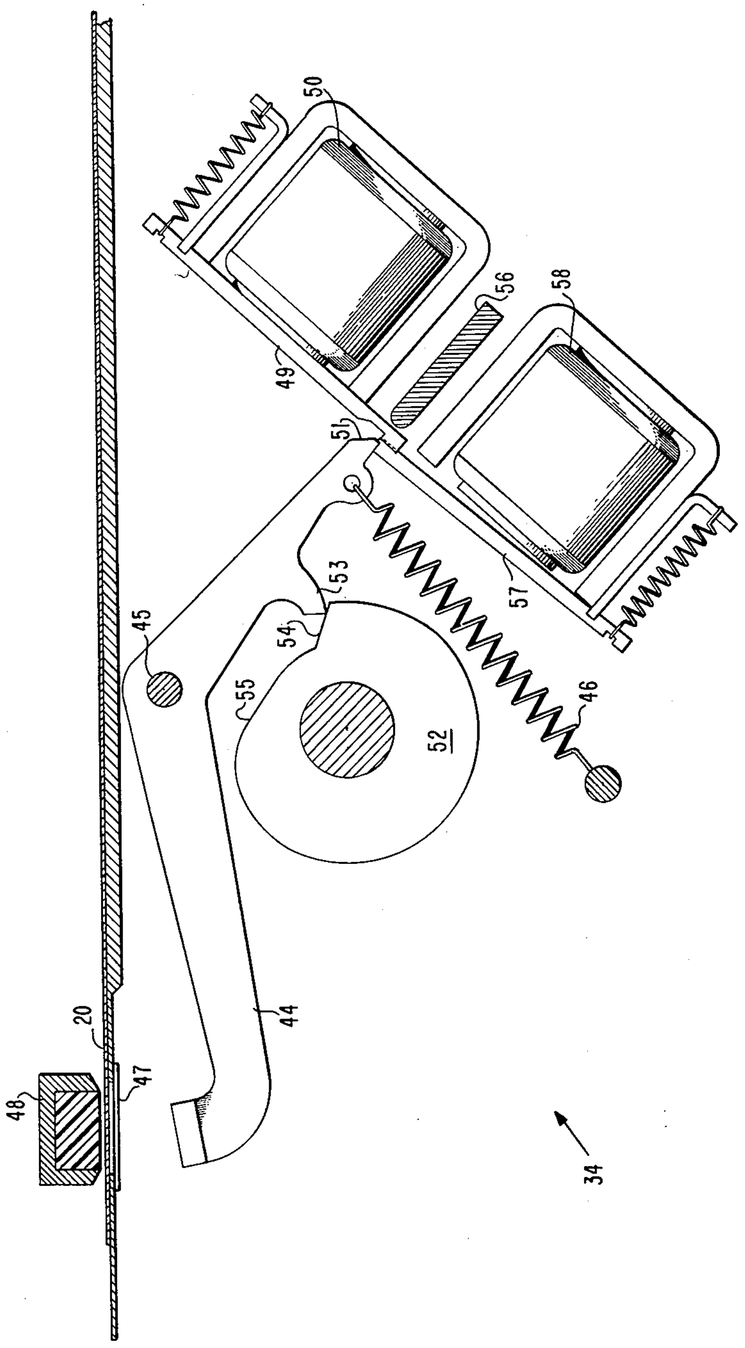
FIG. 2 is a side elevation of one form of type bar and type bar operating means suitable for use in the printing device of FIG. 1.

The type bars are similar to those used in typewriters; each bar bears one character, and character selection is effected by selecting the corresponding type bar. The type bars are constantly urged toward the platen, but each is restrained by a common camming surface and an individual latch. To print, the corresponding latch is released, and when the camming surface rotates synchronously with the card feed to the correct position, a spring causes the type bar to fly toward the platen with a motion controlled by the cam surface. Specifically, FIG. 2 shows the type bar operating mechanism 34 which comprises the type bar 44 adapted to be rotated by a spring 46 on a pivot 45 so as to strike a ribbon 47 and thereby impress the card 20 against a stationary platen 48 which is disposed on the opposite side of the card from the ribbon 47. The type bar 44 is prevented from rotating under the force of the spring 46 by an armature 49 of a magnet 50 disposed so as to interfere with an extension 51 of the type bar 44. In order to synchronize motion of the type with the motion of the card past the platen, a cam 52, synchronously rotating with the card feed, interferes with a finger 53 on each type bar so as to permit rotation of the type bar, and thereby effect a character impression. only when a print position on the card is centered with the platen. The dropping portion 54 of the cam surface is such as to allow rapid rotation of the type bar, and the rising portion of the cam surface 55 is designed so as to minimize type bar bouncing and the shadow printing effect which would result therefrom. As shown, the magnet 50 has been energized, and the type bar has begun its swing to print a character. Also shown in FIG. 2 is a restoring bail 56 which is operated (by mechanism not shown) to restore the armature 49 to the latched position with respect to the type bar extension 51. This bail is operated synchronously with the cam 52 and the card feed so as to relatch each type bar at the end portion of every printing subcycle. In order to save mechanical space, alternate type bars have their latch magnet assemblies placed on opposite sides, as shown by the armature 57 and magnet 58 (shown not energized). The restoring bail is common to all of the magnet armatures 49, 57, etc.

In operation, the coil of the magnet 50 is energized by a pulse from the commutator 29 (FIG. 1) of the column relating to the position 23 in which printing is to occur; the finger 53 is then in contact with the high surface of the cam, but immediately thereafter, the dropping surface 54 and the finger 53 permit the spring 46 to rock the type bar 44 for making the impression, and thereafter the rising portion 55 and the finger 53 return the type bar to its rest position. Since the magnet pulse has passed, the extension 51 is then in a position to allow the reset bail 56 to push the armature 49 back into the latched position (in which the armature 57 is shown). If the type bar is not to print in a subsequent print cycle, the latch will hold the type bar inoperative while the low point 54, 55 on the cam 52 passes by the finger 53.

*Delay Device With Serial Number Advance*

In a previous section, the general function of the "delay units" was discussed. These units are all rotating together, and may be built up on flange sections of a single cylindrical unit. One of such flange sections is shown in FIG. 3, and is identical to the delay unit shown in FIG. 7 of the copending application except for the addition of a resetting ear 124, which will be described below.

The delay units 102 comprise a hollow drum section 110 having nine flanges 111 spaced evenly along the length thereof, there being ten pivot rods 112 extending through all of the flanges 111, throughout the length of the delay unit 102; ten pawls 116 are disposed on the pivot rods 112 between pairs of flanges 111. The drum portion 110 has holes 113 through it to permit restoring fingers 115 and reset bearing ears 114 on the pawls to pass therethrough. The pawls 116 also have interposing faces 118 and switch operating arms 117 thereon. The pawls correspond to, and are arranged in the same order as the digits in the card; the pawl 116–0 corresponding to the digit "0" is shown at the top of the unit under the magnet, the others being arranged in ascending order clockwise around the unit. Above each delay unit is a magnet 120 having an armature 119 disposed so that when the magnet 120 is energized, the armature 119 will be lowered into a position to contact the interposing face 118 of any of the pawls 116 as they revolve thereunder. The pawl 116–0, which corresponds to the digit 0, is shown in the position in which contact would occur if the magnet were energized; when contact occurs, the relative motion of the pivot rod 112, revolving on the rotating delay unit, and the armature 119 cause the pawl to rotate counterclockwise into the position in which the "9" pawl 116–9 is shown. In the rotated position, the switch operating arm 117 extends radially from the flange portion 111 so as to rock the switch contact arm 121 as it revolves past said arm. The switch operating arms are disposed sequentially about the delay unit; the column "*a*" arm **121*a* being two pawl positions displaced from the armature 119** and therefore delayed two cycle points, or print-times, and the column "*h*" arm **121*h*** being displaced nine pawl positions from the armature.

Shown within the delay unit drum 110 is a reset blade 122 mounted on a shaft 123 and disposed for contact with the restoring finger 115 of any rotated pawl. In the end printing mode of operation, a new set of data is, or may be, entered in each machine cycle; the shaft 123 is held fixed, and the reset blade is positioned as shown in FIG. 3, which ensures that no pawl will operate the switch arm 121 unless it is rotated by the armature 119 during the current machine cycle. In serial numbering the switch arm of the higher order delay units must be repetitively operated by the same pawl many times before resetting the pawl: for instance, in the hundreds column, each pawl will cause printing one hundred times before resetting, as more fully described below. One of the prime features of this invention is in providing a delay unit which will automatically reset a lower numbered pawl (116–9) when a higher number pawl (116–0) is rotated. This is effected by the resetting ear 124 (on a higher numbered pawl) forcing the reset bearing ear 114 (on a lower numbered pawl) inward toward the center of the drum. In this way, a pawl will be reset only when a higher pawl is rotated. When operating in the serial numbering mode, a clutch (not shown) connects the shaft 123 to the means (not shown) that continuously rotates the drum 110, so that the relative positions of the blade 122 and the pawls 116 remain fixed, and the blade 122 is ineffective to reset any of the pawls. The restoring finger 115 rests against the edge of the hole 113 in the drum 110 to limit the movement of the pawl 116 in the rotated position, and the reset bearing ear 114 similarly limits the pawl in the restored position. For serial numbering, an additional switch contact arm 177 is provided, as described in a later section.

Figure 3A:
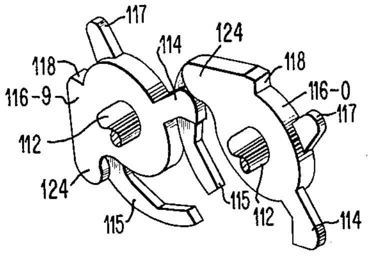
FIG. 3 is a transverse section of a rotary delay device adapted to automatically increase the number set therein for serial number printing control.
Figure 3:
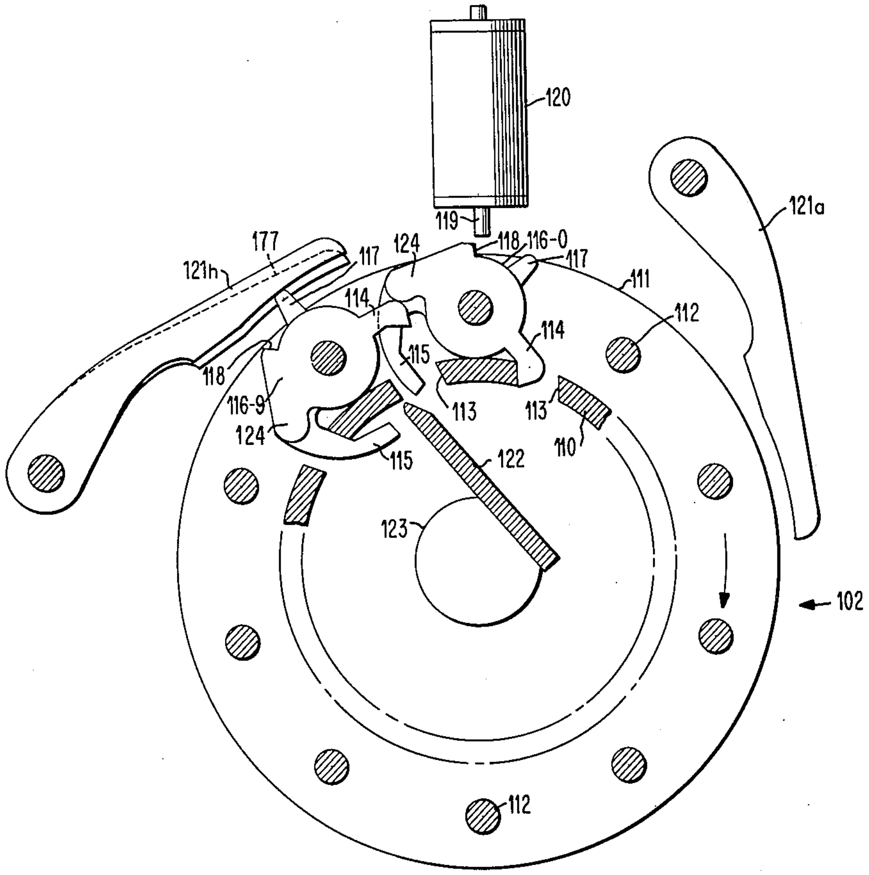

In FIG. 3*a*, the shape of the pawls, which permits overlapping without interference is illustrated. The operation of the delay unit is described in detail in the following section.

*Operation and Timing of End Printer*

The details of the circuits and operation of the end printing part of this embodiment will be described with reference to FIGS. 1–3 but with particular reference to the schematic diagram in FIG. 4 and the timing diagram in FIG. 5, which are similar to FIGS. 8 and 9 respectively of the copending application. Some explanation of FIGS. 4 and 5 will be given first.

Figure 4:
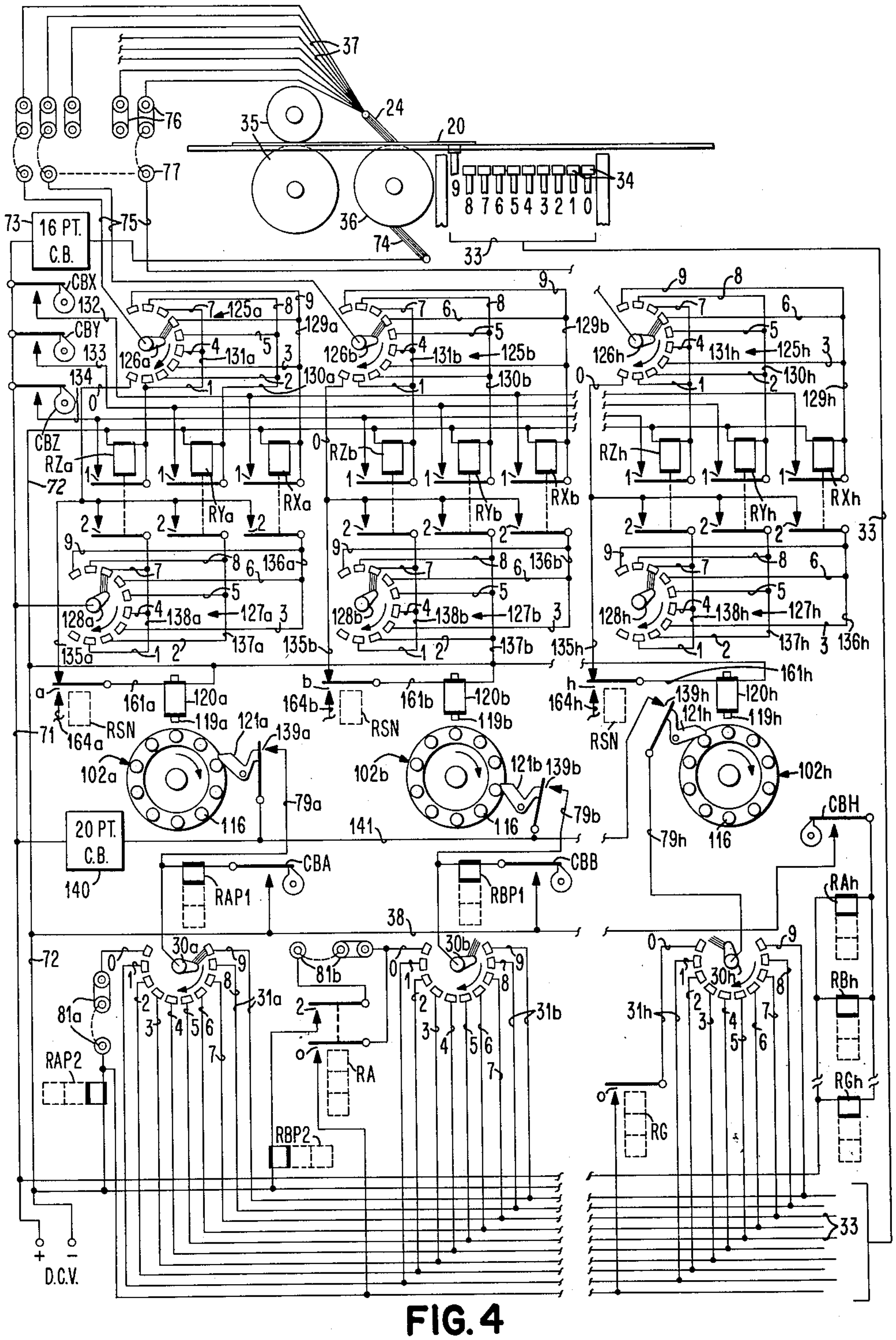
FIG. 4 is a schematic diagram of the circuitry which effects record controlled end-printing in the device of FIGS. 1–3.
Figure 5:
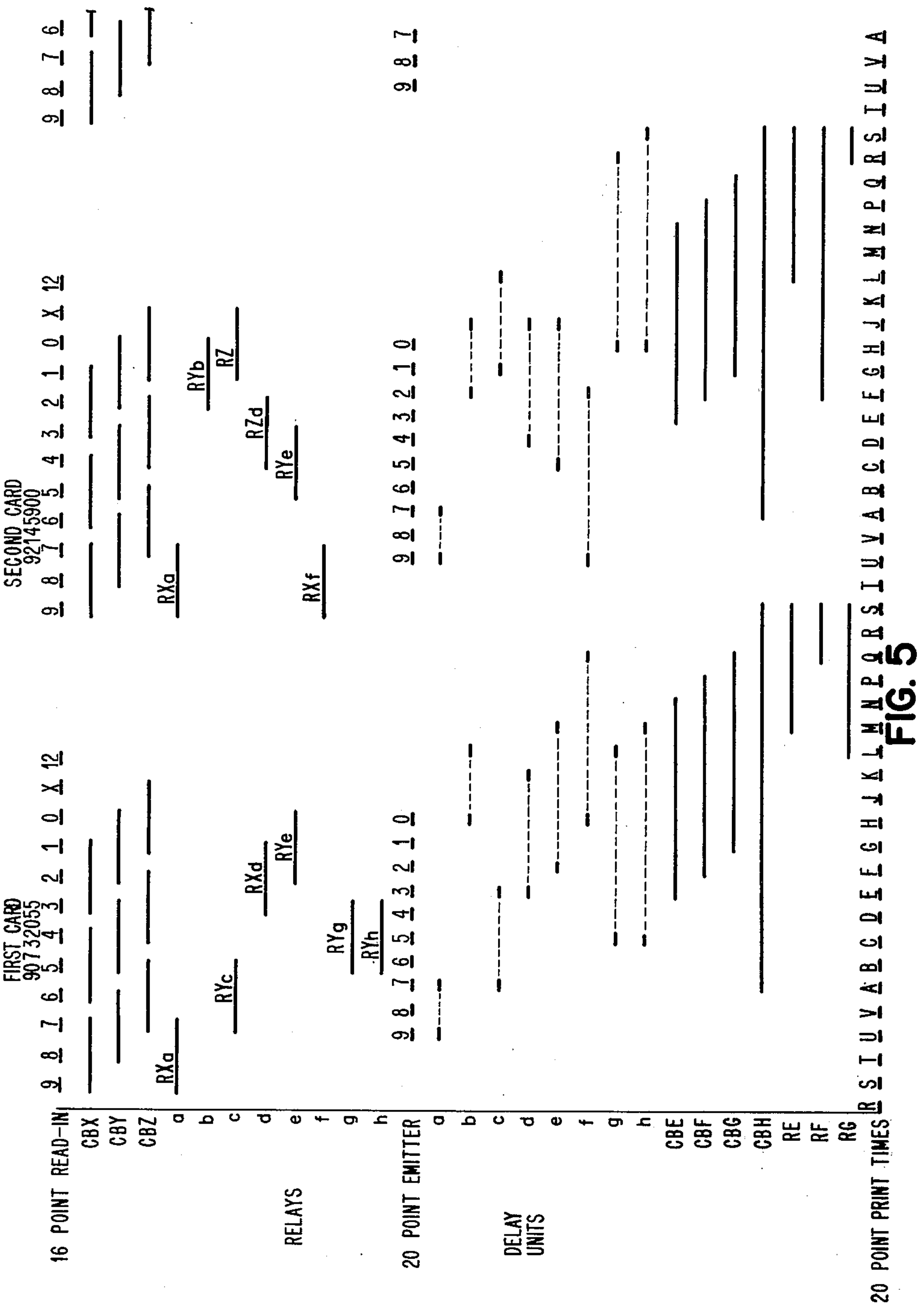
FIG. 5 is a diagram illustrating the timing of record controlled end-printing.

At the top of FIG. 5, the numbers assumed to be punched in two successive cards are shown to be "90732055" and "92145900." The first line of pulses, "16-point read-in" times, illustrates the pulses supplied by a 16-point circuit breaker 73 (FIG. 4) to the brush roller 36; these pulses are identified by the digit values that would be sensed by the brushes at the times indicated. The lines *a, b, . . . h* represent the action of the "delay units" in the corresponding columns: the first heavy dash, coincident with a 20-point digit pulse, represents read-in by the magnet 120, the light dashed lines represent the time during which a rotated pawl 116 revolves toward the readout contact 139; the solid dash at the end of the pawl-revolving time indicates the closing of the read-out contact, which sends a pulse to directly cause printing. The readout and printing times, "20-point print" times, are identified as arbitrary print times "A" through "V." Also shown are the closed times of circuit breakers (CBX, etc.; CBE, etc.) and relays (RX*a*, etc.; RE, etc.) which will be introduced in the following description. FIG. 4 shows three of the eight columns contemplated in this embodiment; the columns not shown (*c, d, e, f,* and *g*) are identical in structure to column "*b*," but have successively increased delays therein.

Referring to the top of FIG. 4, the record card 20 is moved toward the right by the feed rolls 35 so that the holes punched therein will selectively permit the brushes 24 to contact the brush roller 36. A 16-point circuit breaker 73 supplies pulses through a common brush 74 to the brush roller 36; when a hole passes beneath a brush, a pulse is sent along a wire 37 to a respective brush hub 76, thence by plug wire to a print hub 77, and through a corresponding line 75 to a rotor 126 of a cycle point conversion commutator 125. The stator-segments of the commutator are connected in groups; the 9-stator, 6-stator and 3-stator are connected by a common line 129 to the coil of a relay RX; the 8-stator, 5-stator and 2-stator are connected by a common line 130 to the coil of another relay RY; the 7-stator, 4-stator and 1-stator are connected by a common line 131 to a relay RZ. When a digit pulse energizes a relay RX, it will be held on through its number one contact RX1 by a circuit breaker CBX which is energized from 9-time through 7-time, from 6-time through 4-time, and from 3-time through 1-time, as shown in FIG. 5. The relays RY and RZ are energized and held similarly by circuit breakers CBY and CBZ respectively. Shown at the center of FIG. 5 are "20-point emitter" pulses identified as numerals "9" through "0," which are coincident with the "20-point print" times at the bottom of FIG. 5. The 20-point print times are identified with arbitrary letters and are related to the 20-point numerals by the fact that a "9" prints in column "*a*" at A-time. The 20-point digit times 9, 8, . . . 0 represent the times that the corresponding stator-segments 9, 8, . . . 0 will be contacted by a continuously rotating rotor 128 of an emitter 127. The emitter stator-segments are connected in groups like those of the commutators 125; the "9," "6" and "3" stators are connected by a common line 136 to the X-relay number two contact RX2, the "8," "5" and "2" stators are connected by a line 137 to RY2, and the "7," "4" and "1" stators are connected by a line 138 to RZ2.

Operation of the cycle point conversion circuits is best described by taking an example, for which the "first card" of FIG. 5, having the number "90732055" punched therein, will be considered.

The first hole sensed is the "9" in column "*a*." The 9-pulse is sensed and enters the rotor **126*a* at 16-point 9-time (top of FIG. 5) the rotor is then passing the 9-stator of the commutator, and the pulse is passed over the 9-wire and the common wire 129*a*** to the coil of relay RX*a*. RX*a* is thus energized at 9-time, and since the RX holding circuit breaker CBX is closed from 9-time through 7-time, the relay RX*a* will still be energized through its number one contact RX*a*1 when the emitter rotor **128*a* passes its 9-stator, which is the "20-point emitter" time (FIG. 5) identified by a "9." The 20-point 9-pulse passes over the 9-line and the common line 136*a*** through the relay contact RX*a*2, and thence over a line **135*a* to the magnet 120*a* of the delay unit 102*a*, causing the armature 119*a* to rotate the pawl 116*a***; this is shown as the first pulse in the column "*a*" portion of the "delay units" illustration of FIG. 5. The pawl **116*a* revolves toward the switch rocker arm 121*a*** during the time indicated by the lightly dashed portion of the column "*a*" illustration in FIG. 5; the readout contact **139*a*** is closed at A-time, which is shown by the final pulse in the column "*a*" line (delay unit) of the chart. A 20-point circuit breaker 140 sends pulses over a line 141 to all of the readout contacts 139. When the readout contact **139*a* is closed, it passes the pulse over a line 79*a* to the rotor 30*a*** of the readout commutator and the zero suppress relay coil RAP1, as is fully described later.

Returning to the emitter rotor **128*a*, after the rotor 128*a***, passes the 9-stator, it passes the 8, 7, . . . 2, 1 and 0 in succession. Since relays RY*a* and RZ*a* have not been energized by a digit pulse from the card, no pulses on the common lines **137*a* or 138*a* can pass therethrough. The circuit breaker CBX opens at the end of 16-point 7-time, so that the 20-point emitter rotor 128*a* cannot pass pulses therethrough after approximately the start of 20-point 8-time. Thus, the "6" and the "3" will not falsely operate the delay unit. Just after the "9" is passed from the emitter rotor 128*a* to the delay unit 102*a***, a "7" is sensed in column "*c*," and thereafter, a "5" is sensed in columns "*g*" and "*h*." Since there is only one hole in each card column, none of the relays in column "*h*" were energized before 16-point 5-time. The 5-hole in the card is sensed at the time that the rotor **126*h* passes the 5-stator of the commutator. The 5-pulse is thereby passed over the 5-wire and the common wire 130*h*** to the coil of relay RY*h*, which serves the digits "8," "5" and "2." RY*h* is energized at 16-point 5-time and remains on through 16-point 3-time, during which time the emitter rotor **128*h* passes its 6-stator, which sends a 20-point 6-pulse over the 6-wire and the common line 136*h*** to the contact RX*h*2; RX*h* has not been energized, so RX*h*2 is open and the pulse cannot pass. The rotor **128*h* then passes the 5-stator and sends a pulse over the 5-line and the common line 137*h*** to the number two contact of relay RY*h*, which is still closed. The pulse is thus passed onto line **135*h* to the delay unit 102*h***, as before described. The next pulses sensed in order are the "3" in column "*d*," the "2" in column "*e*" and the "0's" in columns "*b*" and "*f*."

Before considering the "0" in column "*b*"; it is necessary to examine the zero suppression circuits (in the lower section of FIG. 4), which are designed to print, alternatively, every zero, or only significant zeros, or to split the printing field into two groups of numbers in which zero suppression can be had or zero printing can be had in either or both of the groups of numbers independently. The mode of operation of the zero suppression circuit is to block every zero normally and to close contacts that will permit the passage of a zero pulse to the zero type bar magnet under specific operating conditions. In the highest order column, column "*a*," a zero can never be significant, and the only way a zero can print is for it to be connected through the zero suppression hub **81*a* so as to print a zero whenever a zero is read out through the readout contacts 139*a***. Each of the succeeding lower order columns ("*b*," "*c*," . . . "*h*") can print zeros only through a contact of a preceding zero suppression relay. Except in column "*a*," this printing of zeros is selectable only at the preceding column hub 81; that is, only if the zero suppression relay (RA) has been energized will the zero in a particular column (column "*b*") print. The circuit breakers CBA, CBB, . . . CBG (not shown) are each closed only during the time in which any digit "1" through "9" may be passed through the corresponding readout contacts **139*a*, 139*b*, . . . 139*h***; This ensures that the number one pick coils RAP1, RBP1, . . . RGP1 (not shown) will be energized only if a significant digit is to be printed. Once energized, the zero suppress relays are held operative by respective hold coils RA*h*, RB*h*, . . .

RG*h*, which are energized by a holding coil circuit breaker CBH until such time as any possible zeros have had time to pass. For simplicity, the relays RA, RB . . . RG are defined to be of the type having one or two pick coils (RAP1, RAP2, etc.) of sufficient magnetic strength to move the relay armature, and having a hold coil (RA*h*, etc.) of only enough strength to maintain the contacts in the closed position, and not enough strength to initially close the contacts by swinging the armature.

Returning to the "9" in column "*a*," it will be recalled that a pulse passes from the 20-point circuit breaker 140, over the line 141, through the readout contact 139*a*, along the line 79*a* through the commutator rotor 30*a*, which is passing its 9-stator, over the 9-wire 31*a* to the 9-wire 33 so as to energize the print magnet 50 (FIG. 1) of the "9" type bar 44. At the same time, the pulse energizes the number one pick coil RAP1 of the column "*a*" zero suppress relay RA through the column "*a*" relay circuit breaker CGA which is energized only during the time that a significant digit ("9" through "1") can pass through the readout contact 139*a*, which is from A-time through J-time. Since only one pulse per cycle can pass through each column, it is possible to hold all of the zero suppress relays until the end of each cycle. Therefore, all hold coils RA*h*, RB*h*, . . . RG*h* can be energized through the same circuit breaker CBH until the lowest order zero can print, which is at S-time, as more fully described hereinafter. After the "9" is sensed in column "*a*," other digits are sensed in order: "7" in column "*c*," "5" in columns "*g*" and "*h*," "3" in column "*d*," "2" in column "*e*," and "0" in columns "*b*" and "*f*." The more rapidly occurring pulses (20-point) are aligned in time with the slower pulses (16-point) by having the "0's" coincident; it is not necessary, therefore, to provide a delayed indication of a "0" having been sensed. The "0" in column "*b*" is passed directly through the 0-stator by commutator rotor 126*b*, along the wire 135*b* to the magnet 120*b* of the delay 102*b*. At 20-point 0-time, the armature 119*b* rotates the pawl 116–0 on the delay unit 102*b*, which revolves through three positions (shown as the light dashed lines in the column "*b*" line in FIG. 5) before closing the readout contact 139*b* at L-time. The readout contact 139*b* sends a pulse from the 20-point circuit breaker 140 onto the line 79*b* and to the rotor 30*b* as it passes the 0-stator segment of the commutator. The "0" passes down the 0-line 31*b*, through the 0-contact of the column "*a*" zero suppress relay RA, which is being held closed by the hold coil RA*h* and the hold circuit breaker CBH. Thus, the "9" in column "*a*" sets up RA so that the "0" in column "*b*" can print. The "0" pulse from the delay unit 102*b* also goes to the number one pick coil RBP1 of the column "*b*" zero suppress relay RB, but since the circuit breaker CBB is closed only during the time that a significant digit can read out of the column "*b*" delay unit 102*b*, from B-time through K-time, the "0" pulse (at L-time) cannot find a return circuit to the negative line 72, and RBP1 is therefore not energized. However, assuming the zero suppress hubs 81*b* to be connected through control panel wiring, the pulse passing through the 0-stator of the commutator rotor 30*b* will not only cause printing, but will also pass through the 2-contact of RA and energize RBP2, so that a zero can print in column "*c*."

As illustrated above, a zero may print in a column if a significant digit appears in the next higher order column so as to energize the number one pick coil of the zero suppress relay, or if the zero suppress hub is connected and a zero appears in the column so as to energize the number two pick coil of the zero suppress relay. Notice that in the above example, the "0" would have printed in column "*b*" even if the column "*b*" print hub 81*b* were not connected; however, had there been a zero in column "*c*," it would not print in this case. Printing of every zero, even to the left of any digit can be effected by connecting all of the print hubs 81; printing of every zero after a significant digit is effected by connecting all of the print hubs

81 except in column "*a*" (81*a*). Two separate composite numbers, for instance, 0010/0329, with every-zero printing in the first group, and significant-zero printing in the second group can be effected by connecting the print hubs 81*a*, 81*b*, 81*c* (not shown) and not connecting 81*d* (not shown). Thus, in this example, the first two non-significant zeros can print, but the zero in column "*e*" (preceding the "3") is suppressed since the hub 81*d* is open and RDP2 cannot be energized by the "0" pulse in column "*d*."

Note that zero suppression is not essential to random printing or serial numbering, but is presented here only as a feature of this embodiment.

The delay units and commutators receive only digit pulses corresponding to holes punched in the cards, and since there is only one hole punched in each column of a correct card, provision need be made to receive only a single pulse during the read-in portion of each cycle. Should there be two digits punched in one column of the card, the higher number would print first and the lower number would be superimposed on it, giving an indication of the error in the card. Since there is only one number per column per card, the zero suppress relays can only be energized once per cycle, and therefore they may be held energized in common to the end of the cycle, as before described. FIG. 5 illustrates the random printing time delays; for instance, the first card reads a "5" in columns "*g*" and "*h*" simultaneously, but print position 23*h* passes over the "5" type bar one print-time (M-time) after print position 23*g* (L-time), and so printing of the "5" in column "*h*" is one print-time later. Similarly, in the second card, print position 23*d* is over the "4" type bar at the same time that print position 23*e* is over the "5" type bar; there is one print-time delay per lower number and per lower column, and in this case a lower number in a higher column prints simultaneously with a higher number in a lower column.

In summation of record controlled printing, the holes 39 in the card 20 are read digit-by-digit in several columns (*a*, *b*, . . . *h*). The digit pulses selectively permit relays to later pass corresponding 20-point digit pulses to the delay units which provide fixed and random delay for the 20-point pulses. The pulse outputs are sorted by digit at the commutators 29 which thereby convert the digit pulses in the several columns, the digit values of which are known by the time of appearance, to pulses translating to the several type bars, the column relation of which is determined by the time of appearance.

*Operation and Timing of Serial Numbering Printer*

The circuitry used in the serial numbering mode of operation of this embodiment, and the operation and timing thereof, will be described with reference to FIGS. 1–3 and will particularly be concerned with the schematic diagram in FIG. 6 and the timing diagram in FIG. 7, which is similar to that in FIG. 5.

As described, the same delay and print mechanism may be used for end-printing or for serial numbering; more particularly, the end-printing control circuits can be used to set up the first number to be printed, and the serial numbering circuits then connected to control the numbers to be printed thereafter. The serial numbering mode of operation is that in which the switch means RSN in FIG. 1 is connected oppositely to the way shown; thus, the brushes 24 and "Cycle Point Conversion" circuits 100 are no longer connected to the delay units 102, and control over printing is effected by the "Serial Number Advance" circuits 163.

The switch means RSN (FIG. 1) comprises a relay RSN (FIG. 6) which switches the serial numbering on, and a second relay RSF which switches the serial numbering off by controlling the relay RSN. Referring to the middle of FIG. 4 and the top of FIG. 6, it is noticed that the input to the delay units 102 will be from the end printing (record controlled) circuitry whenever the relay RSN is disenergized and it will be from the serial numbering circuitry whenever the relay RSN is energized. Referring to the middle of FIG. 6, relay RSN can be energized in three ways: by pulses from the "ON" hub 172 or the "ON" switch 174, when the auto/man switch 170, 171 is in the automatic or manual position (as shown) respectively, and through its own holding contact RSN1 and the normally closed off relay contact RSF1. In the manual position shown, the auto/man switch 170 connects one side of the manual "ON" switch 174 to the coil of RSN, the other side being connected to the positive voltage line 71. When the "ON" switch is pressed, it will momentarily connect the voltage from line 71 to RSN, and will then return to the open position. RSN will pick up closing its hold-contact RSN1 which will hold RSN energized through the normally closed contact RSF1. To manually return the machine to end printing, the "OFF" button is pressed, momentarily energizing RSF so as to open its contact RSF1 and break the circuit to RSN. For automatic operation, the auto/man switch 170, 171 is placed in the position opposite to that shown. By sensing a pulse (for instance an X-pulse) coupled to the "ON" hub 172 by control panel wiring, the relay RSN can be made to operate automatically: a card punched with the lowest number in a series could be fed through the machine to set up the pawls in the desired manner, and the operation could automatically shift into the serial numbering mode; to shift back into record controlled end-printing, an "X" could be sensed in another column of the card, and coupled through the "OFF" hub 173 to the off relay RSF to break the circuit to RSN. A further discussion of this follows at the end of this section.

Figure 6:
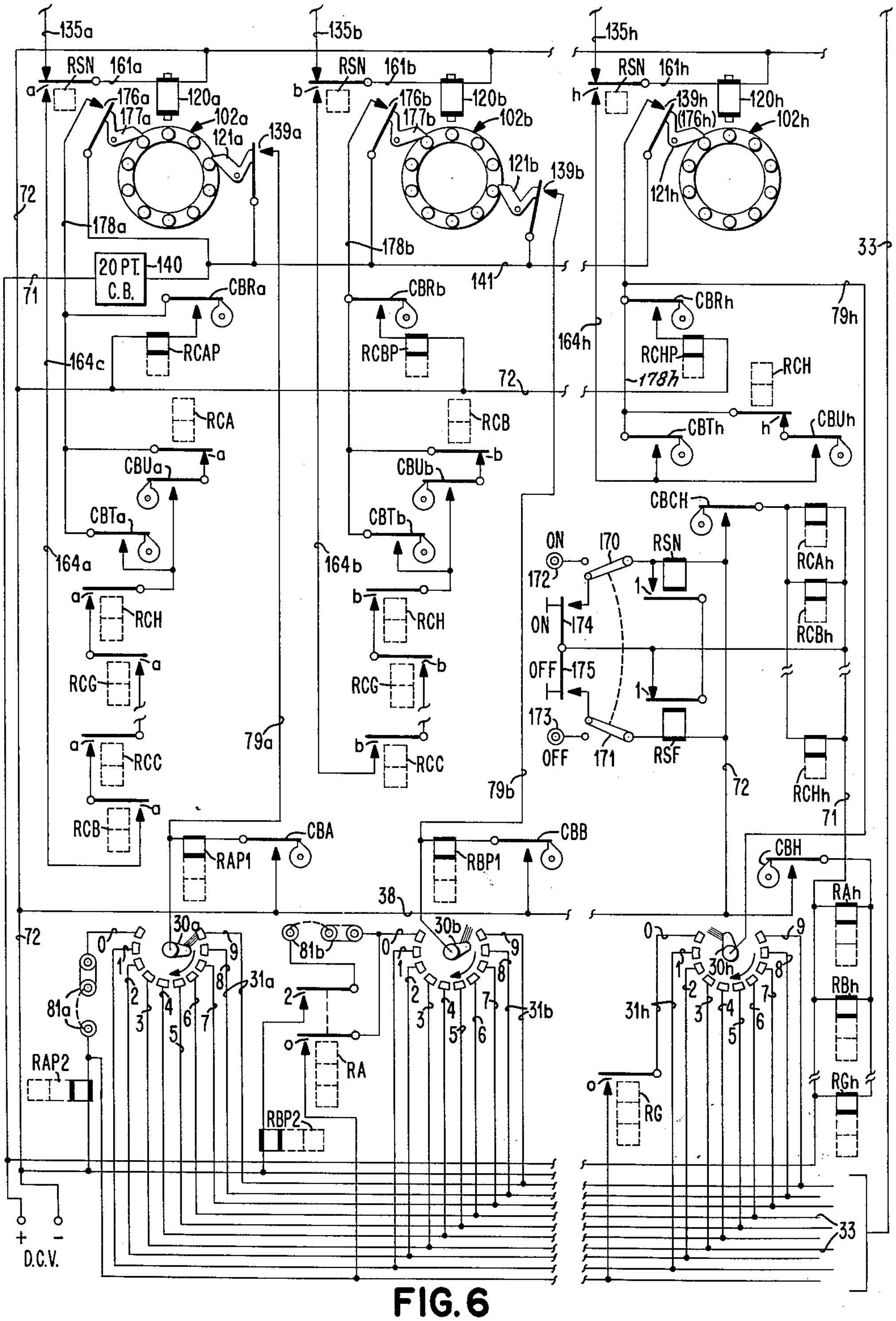
FIG. 6 is a schematic diagram of the circuitry for automatic serial numbering and for selecting either the serial numbering or end-printing mode of operation.

Referring to the top of FIG. 6, each of the delay units 102 will control printing as in the end-printing mode of operation by passing a pulse from the 20-point circuit breaker 140 over the line 141 through a readout contact 139 over a line 79 to a rotor 30 of an output commutator. The zero suppression circuits work identically as in the end printing mode of operation.

As mentioned in an earlier section, the reset blade 122 (FIG. 3) is clutched to rotate with the delay unit during the serial numbering mode of operation; therefore, when a pawl once becomes rotated, it will remain in the rotated position until reset by the adjacent pawl of the next higher number, one pawl position clockwise therefrom; when a pawl is rotated by contact with the armature 119 of the read-in magnet 120, the resetting ear 124 will contact the reset bearing ear 114 of the next lower numbered pawl. A carry contact 176 is provided for each of the delay units; this contact is in the same position on each of the delay units: one pawl in advance of the read-in magnet 120; notice that the column "*h*" delay unit carry contact 176*h* and readout contact 139*h* are in the same position, and only one contact is therefore provided. The carry contacts are located in such a position that a rotated one of the pawls will rock a switch contacting arm 177 at the exact moment that the next higher numbered pawl is passing beneath the read-in magnet 120; a rotated pawl thereby (through circuits described below) causes rotation of the next higher pawl, which in turn causes resetting of the initially rotated pawl.

In serial numbering, the lowest order column (column "*h*") changes its setting once per cycle; that is, the digit value increases by one every cycle. The tens column (column "*g*"), however, will increase in its setting only when the units column has completed cycling through ten digits; in like manner, the hundreds column will advance its setting only once per one hundred cycles. Therefore, an automatically advancing number device must be provided with means to advance the units column automatically once per cycle, and with means to permit advancing the higher ordered columns only when the next lower order column changes from a "9" to a "0." In the subject embodiment, both of these functions are initiated upon the closing of the carry contacts 176. Considering the lowest order column as an example, when the carry contact 176*h* is closed by a rotated pawl, a pulse passes from the 20-point circuit breaker 140, over line 141, through the carry contact, down along the wire 178*h* to a parallel circuit, one branch of which comprises an advance control relay circuit breaker CBT*h* and the other branch of which comprises a normally closed relay contact RCH*h* (described below) and a second advance control circuit breaker CBU*h*; providing the pulse can pass through one or the other of these parallel paths, it will then travel along the line 164*h* upward and through the now closed contact of the serial-numbering-on relay RSN*h*, over the line 161*h* to the read-in magnet 120*h*. The entire advance control circuitry is involved with whether or not the pulse passed by the carry contact 176*h* can or cannot reach the read-in magnet 120*h*, depending upon the number set in this column and (with respect to the higher order columns) the number set in successively lower columns. When the pulse passes from the carry contact 176*h* down the line 178*h* it will also energize a carry relay pick coil RCHP if the carry relay circuit breaker CBR*h* is closed. The carry relay circuit breaker CBR is closed only at the time when a 9-pawl can close the readout contacts 176; thus the carry relay pick coil RCHP can be energized only upon a 9-pawl closing the carry contact 176*h*. The advance control circuit breaker CBT*h* will permit only a 9-pulse to energize the read-in magnet 120*h* after the carry relay RCH has been energized. The other normally closed contact of the carry relay RCH*h*, in series with the advance control circuit breaker CBU*h*, is there to prevent any pulses from passing therethrough to the read-in magnet 120*h* after the carry relay has been energized. This will be described more fully below. Referring now to column "*b*" in FIG. 6, it is seen that the serial number advance circuitry similar to that which was described for column "*h*" has additional relay contacts therein. These relay contacts comprise one normally open contact for the carry relay of each subsequent lower order column; these relay contacts prevent a pulse from the carry contact 176*b* from energizing the read-in magnet 120*b* except when all subsequent lower order columns are standing at "9." This is so because the carry relay in the subsequent columns cannot be energized except through the respective contact of the carry relay circuit breaker CBR which is closed only at a time when 9-pawls can close the corresponding carry contact 176. In column "*b*," there are contacts for each column from "*c*" to "*h*," that is, RCC through RCH. Referring to column "*a*" in FIG. 6, it will be seen that column "*a*" is identical with column "*b*" except that it has an additional carry relay contact RCB*a*, which is indicative of when column "*b*" is set at a "9."

Figure 7:
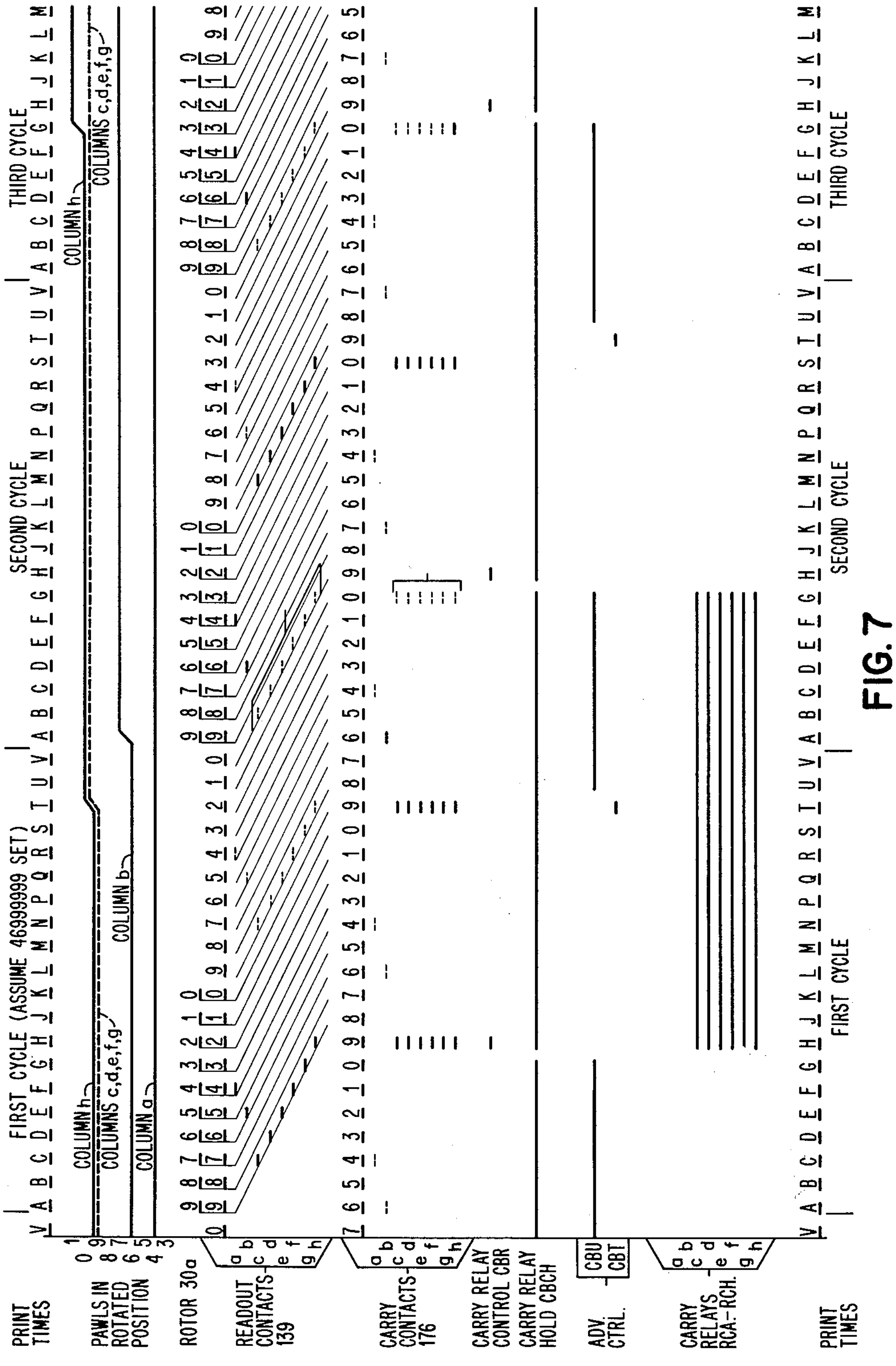
FIG. 7 is a timing diagram of the serial numbering mode of operation.

A better understanding of the circuit can be obtained by taking an example and considering the circuit in conjunction with the timing diagram of FIG. 7. In FIG. 7, it has been assumed that the number "46999999" has been set up in the delay units, and that the device is on the serial numbering mode of printing. At the top and bottom of FIG. 7 are shown the print-times which correspond to the print-times previously described with reference to FIG. 5. The second illustration from the top of FIG. 7 shows which pawl is rotated for the various columns; at the start of the first cycle the 4-pawl is rotated in the column "*a*" delay unit, the 6-pawl is rotated on the column "*b*" delay unit, and the 9-pawl is rotated on the delay units for column "*c*" through "*h*." Recalling that the readout contacts 139 are 1 pawl-position farther around the delay unit on subsequent lower ordered columns, and that the reset blade 122 has been rendered inoperative, the passing of the pulses through the readout contact is shown to occur twice in each cycle, with the timing of the readout contact closure being the same as that described in the end printing mode of operation. Notice that pawls of the same numeral significance (for example, the 9-pawls) in subsequent lower ordered columns will close the respective readout contact one print-time later than in the next higher column. However, since the carry contacts 176 are in the same position on each of the delay units, all pawls of like number close the corresponding carry contact at the same time with respect to a machine cycle; that is all 4-pawls close their respective carry contacts at C time, all 6-pawls close their respective carry contacts at A-time, and all 9-pawls close their carry contacts at H-time. Since the delay units rotate twice in each machine cycle, the pawls revolve past the carry contacts twice in each machine cycle; thus the 4-pawl will close its corresponding carry contact at N-time, the 6-pawl will close a carry contact at L-time, and the 9-pawl will close the carry contact at T-time, as well as at the previously mentioned times. In the first cycle, the first carry contact to be closed is 176*b*, closed by a "6" at A-time; at this time, the carry relay control circuit breaker CBR (FIGS. 6 and 7) is not closed, and so the carry relay is not energized. Since the carry relay control circuit breaker CBR is closed only at H-time, it can be seen that closing the carry contacts 176 only by 9-pawls can effect the energization of the carry relay RCA, RCB, . . . RCH.

Referring to the top of FIG. 6, the only way in which the read-in magnet 120 can be energized, when RSN is energized and the device is therefore in the serial numbering mode of operation, is for a pulse to appear on line 164 after having passed through the carry relay contacts related to each one of the lower order columns. As it was just seen, the carry relay cannot be energized except by rotated 9-pawls which close the carry contact at H-time. Therefore, in any given column, a pawl cannot be rotated to advance a setting in the delay unit except when the readout contact 176 of each of the lower order columns has been closed by a 9-pawl.

Referring again to the example shown in FIG. 7, the second pawl to close the readout contact is the 4-pawl on the column *"a"* delay unit. Since the 4-pawl in column *"a"* will close a carry contact at C-time, and since the circuit breaker CBR is closed only at H-time, the column *"a"* carry relay RCA will not be energized by the 4-pawl. At H-time each of the 9-pawls on the column *"c"* through column *"h"* delay units closes its respective carry contact 176*c*, 176*d*, . . . 176*h*; since the carry relay control circuit breaker CBR is closed at H-time, the pick coils of each of the related carry relays RCCP, RCDP (not shown), . . . RCHP, will be energized. By referring to the very center of FIG. 6, it will be seen that column *"b"* contains contacts for the carry relays RCC, RCG, . . . RCH. Therefore, insofar as carry relay contacts are concerned, column *"b"* is set up to advance its pawl setting by one unit. In the center of FIG. 7, is shown the timing of the carry relay hold circuit breaker CBCH, which is also shown in the right-hand center of FIG. 6, and supplies holding voltage to the hold coils of RCA, RCB, . . . RCH. In view of the fact that the 9-pawls energize the carry relays at H-time, and the carry relay hold circuit breaker CBCH is closed from H-time through G-time, the carry relays will be on until the end of G-time. Therefore, any closing of the column *"b"* carry contact between H-time in the first cycle and G-time of the second cycle will be permitted to pass through the carry relay contacts so as to energize the read-in magnet 120. In series with the carry relay contacts are two parallel paths previously introduced. Advance control circuit breaker CBT is closed only at T-time; the other advance control circuit breaker CBU is closed from U-time through G-time. Recalling that the column *"b"* delay unit has a 6-pawl rotated thereon, no pulse appears on the line 178 when the carry relay control circuit breaker CBR is closed at H-time and therefore the carry relay pick coil for column *"b"* (RCBP) has not been energized and its normally closed contact of RCB*b* is still closed and pulses may pass through the advance control circuit breaker CBU in order to energize the read-in magnet 120*b*. In each of the columns in which a 9-pawl has closed the carry contacts, the carry relay has been energized opening the related normally closed *b*-contact; this means that no pulses can pass through the advance control circuit breaker CBU, and therefore that any pulses which are to energize the read-in magnet 120 must pass through the advance control circuit breaker CBT; at T-time all of the rotated 9-pawls again close the carry contact 176 associated with the respective delay units, and since the advance control circuit breaker CBT is closed, each of the corresponding read-in magnets 120 will be energized setting the 0-pawls which in turn reset the 9-pawls. In this manner, each of the delay units which had been set at "9" is reset to "0" at T-time in the first cycle. At A-time in the second cycle the 6-pawl of the column *"b"* delay unit will close the readout contact 176*b* at a time when the 7-pawl is passing beneath the read-in magnet 120; this will cause the 7-pawl to be rotated into the operative position which in turn will cause the 6-pawl to be reset into the inoperative position as before described with the 0- and 9-pawls, and as shown at the top of FIG. 7. At C-time of the second cycle, the 4-pawl in column *"a"* again closes the carry contact 176*a* but since the column *"b"* carry relay is not energized, the read-in magnet 120*a* will not be energized and therefore the 4-pawl continues to stand in column *"a."* At G-time in the second cycle, all of the 0-pawls which had most recently been reset will close their carry contacts; however, since the carry relays are held on through G-time in the second cycle, the normally closed carry relay contacts in series with the advance control circuit breaker CBU are still open, and therefore no pulses can pass through that branch of the circuit. Similarly, since the advance control circuit breaker CBT is closed only at T-time, no pulses can pass through that branch of the circuit; thus, the closing of the carry contacts at G-time has had no effect. Referring again to the readout contact illustration of FIG. 7, in the first half of each cycle the closing of the readout contact is shown by solid pulse lines, and in the second half of each cycle, the closing of the readout contacts is shown as dotted pulses; only those pulses received in the first half of each cycle are operative to effect printing, since the output commutator rotors 30 (FIG. 6) will make contact with corresponding stator segments during A- through H-times only. At A-time in the second cycle, no pawls have closed a readout contact and no printing is therefore effected. At B-time in the second cycle, the 0-pawl in column *"c"* closes the readout contact 176*c* but since the rotor 30*c* is then approaching the 9-stator and in contact with no stator at all, no printing is effected; from the foregoing, it can be seen that when any delay unit is advanced from a "9" to a "0," both the readout contacts and the carry contacts are redundantly closed by the 0-pawls; these redundant contact closings are shown as included within the brackets in FIG. 7. At K-time in the second cycle the 7-pawl now rotated in column *"b"* will close the column *"b"* carry contact 176*b*, but there being no lower order carry relays energized, this closing of the carry contact will have no effect. At M-time in the second cycle, the 0-pawl in column *"c"* will close its readout contact and since the rotor 30*c* will then be standing on the 0-stator, a "0" will print in column *"c"*; similarly at P-time in the second cycle, the 7-pawl closes the readout contact 139*b* but since the rotor 30*b* is standing in space somewhere between the 0- and 9-stators, at this time nothing prints in column *"b"*; similarly the "4" will not print in column *"a"* at R-time.

The purpose of the series path comprising the normally closed carry relay contacts RCA*a*, RCB*b*, . . . RCH*h*, and circuit breakers CBU*a*, CBU*b*, . . . CBU*h* is to prevent the redundant set of zeros shown at G-time in the second cycle from operating the read-in magnets and thereby causing a "0" to change to a "1" before the "0" has a chance to print, between K-time and S-time in the second cycle.

The lowest column, column *"h"* must be able to advance itself automatically one pawl per cycle; at G-time in the third cycle, each of the carry contacts 176 for columns "c" through "h" are closed by the respective 0-pawls, but since each of the columns "c" through "g" can pass pulses only through contacts of lower order carry relays, nothing happens in these columns; however, in column "h," there are no lower order carry relay contacts in series with the readout contacts 176h and since the "0" does not occur when the carry relay control circuit breaker is closed at H-time, the column "h" carry relay RCHP has not been energized; therefore, a "0," or any other digit in column "h" can be passed through the series circuit of the normally closed h-contact of the column "h" carry relay RCHh and the advance control circuit breaker CBUh which is closed from the beginning of U-time to the completion of G-time. Referring to the top of FIG. 7, it will be seen that at G-time in the third cycle the "0" in column "h" is reset by the setting of the 1-pawl. In operation, column "h" will continue to advance until its 9-pawl closes the carry or readout contact 139h, 176h at H-time, and this will permit the "0" in column "g" to energize the column "g" read-in magnet 120g and set the 1-pawl in column "g"; in a like manner column "h" will continue to cycle from "1" through "9" and "0," and every time column "h" goes from "9" to "0" it will advance column "g"; column "g" in turn will continue to cycle from "1" to "9" and "0," and will advance column "f" by one unit whenever column "g" goes from "9" to "0."

In summation, it has been seen that the automatic serial numbering circuitry performs the following two basic functions: (1) Each time a 9-pawl in any column closes a carry contact at T-time, it will energize the carry relay, which will permit the next higher ordered column to advance. (2) Whenever any pawl in any column closes the carry contact and each of the lower ordered columns has energized its carry relay, the next higher numbered pawl in said first mentioned column will be set, and the contact-closing pawl will be reset. A subsidiary function is provided in that a normally-closed contact of each column's own carry relay is provided to prohibit the redundant closings of the carry relays by the 0-pawls from setting up 1-pawls prior to printing the zeros.

The automatic control of RSN with X pulses from a record was previously introduced. Referring to FIG. 5, a "9" in column "a" is the first pulse to energize a read-in magnet (120a, at U-time) and a "0" in column "h" is the last pulse to operate a read-in magnet (120h, at H-time). Therefore, to set pawls according to record card punches requires that the switch means RSN be off (end-printing) from U-time of the prior cycle to H-time of the current cycle. Also, in order that the reset blade 122 (FIG. 3) does not reset pawls needed for the first numeral in serial numbering, the reset blade 122 must be clutched to rotate with the delay units 102 prior to H-time which is the time that the 9-pawl, will approach the stationary position of the reset blade. A column of the card not used to indicate a numeral can have any number from "9" to "1" punched in it to clutch the reset blade 122 before H-time, and can have an "X" punched in it to energize the serial-number-on relay RSN through the "ON" hub 172. The device will then automatically print numbers on a stack of cards until another set of control punches is sensed in a card. A card placed in the stack just prior to the next card which is to control setting the pawls, can have a "0" punched in the extra column, which will cause the clutch to release the reset blade and energize the serial-number-off relay RSF through the "OFF" hub 173, thus placing the machine in the end-printing mode of operation, under record control.

Using an "X" punch to operate the reset blade clutch will cause the reset blade to rotate between the 0-pawls and the 9-pawls. When the "0" punch is used to declutch the reset blade, the blade will be left standing at the position shown in FIG. 3.

*Summary*

The machine just described has been presented in the form of an end-printing machine, with automatically operable serial numbering. By comparing FIG. 4 and FIG. 6 the use of the same basic means for printing in either mode of operation is apparent. FIG. 4 has record-sensing and cycle point conversion means; FIG. 6 has serial number advance control means. Since the delay units operate at the printing frequency (20-point basis in this embodiment), no cycle point converison is needed when serial numbering. The zero suppression circuitry is equally compatible with either mode of operation, and is automatically responsive to the delay unit regardless of the mode of operation in which the machine is operating. Thus, the invention as presented in this embodiment represents a minimum of mechanism, and since the printer control and accumulation are both effected in the delay units, the machine operates in a minimum of time.

The features of this invention are not limited to machines which print across the end of a record, but are equally suitable for interpreting, the analysis of which, given in my aforementioned copending application, is fully applicable here.

While the invention has been particularly shown and described with reference to a preferred embodiment, it will be understood by those skilled in the art that various changes in the form and details may be made therein without departing from the spirit and scope of the invention.

I claim:

1. In a data processing machine in which different data designations are manifested at corresponding ones of a sequence of times recurring at regular intervals, the combination of a plurality of storage elements each corresponding to different ones of said data designations, input means to enter data into said storage elements, means to cyclically condition each of said storage elements to be responsive to said input means successively in a timed sequence, different ones of said storage elements being selected to store different data designations according to the time of entry of said data by said input means, means responsive to said storage elements for emitting data at times different from the corresponding time in said sequence, and means to selectively transmit said emitted data to said input means.

2. In a data processing machine in which different data designations are manifested at corresponding ones of a sequence of times recurring at regular intervals, the combination of a plurality of storage elements each corresponding to different ones of said data designations, input means to enter data into said storage elements, means to cylically condition each of said group of storage elements to be responsive to said input means successively in a timed sequence, different ones of said storage elements being selected to store different data designations according to the time of entry of said data by said input means, means responsive to said storage elements for emitting data at a time in said sequence one interval in advance of the time corresponding to the designation of said data, and means to selectively transmit said emitted data to said input means for entering data corresponding to said advanced time.

3. In a data processing machine in which different data designations are manifested at respective ones of a sequence of regularly recurring times, the combination of a plurality of means for storing said data designations, different ones of said means corresponding to different data designations; means to enter said designations into corresponding ones of said storage means; means rendered effective by said storage means for emitting data manifestations corresponding in designation to the data stored in said storage means, at times recurring sooner than the corresponding times of said designations in said sequence; and means to transmit said emitted data to said entry means to thereby effect conversion of data of a first designation to data of a preceding designation in said sequence.

4. In a data processing machine in which different data designations may be manifested at respective ones of a sequence of times recurring at regular intervals corresponding to the significance thereof, the combination of a plurality of storage element groups arranged in a second sequence, each element thereof corresponding to a different one of said data designations; means corresponding to each of said groups to enter data into said storage elements; means to cylically condition each of said storage elements to be responsive to the related one of said input means successively in timed sequence, different ones of said storage elements being selected to store different data designations according to the time of entry of said data by said data entering means; means responsive to said storage elements for emitting data corresponding in significance to said storage elements but at a time in advance of said corresponding time; switch means for each of said groups responsive to data of the highest significance in said sequence; and means including the ones of said switch means corresponding to each group subsequent in said second sequence for selectively transmitting the data emitted from said group to the corresponding one of said input means.

5. In a data processing machine in which data designations of sequential significance are manifested at corresponding times regularly recurring in a like sequence, the combination of a plurality of storage means arranged in a second sequence; a plurality of data receiving means, one for each of said storage means, each of said data receiving means being adapted to respond to a data manifestation to enter a corresponding item of data into its related storage means, each of said storage means being adapted to cyclically isue a data manifestation adjacent in said data designation sequence to said corresponding item of data, and means to selectively transmit the adjacent manifestation issued by one of said storage means to its related data receiving means in response to each of said storage means antecedent thereto in said second sequence having issued data manifestations of terminal significance in said data designation sequence.

6. In a data processing machine in which different data designations are manifested at respective ones of a sequence of regularly recurring times, the combination of an armature displaceable by a magnet in response to said data designation; switch means for selectively energizing said magnet; a sequence of rotatable pawls each respectively corresponding to one of said data designations; and cyclic means for sequentially moving each of said pawls past said armature at the one of said sequence of times at which the respectively corresponding data designation may be effective to operate said magnet, the shape of said pawls and the position of said armature when displaced being effective to cause rotation of select ones of said pawls in response to corresponding data designations, said switch means being disposed for contact by a rotated one of said pawls approaching said magnet so as to close said switch means when in contact therewith at a time when a pawl corresponding to an antecedent time in said sequence in operatively passing said armature, whereby each of said pawls may successively operate a pawl antecedent thereto in said sequence.

7. In a data processing machine, an accumulating device comprising a continuously rotating drum; a magnet disposed near the periphery of said drum having an armature oriented so as to extend toward said drum when said magnet is energized; a plurality of pawls, each disposed for rotation on one of a plurality of pivots arranged around the periphery of said drum, the axes of said pivots being parallel to the axis of said drum; a projection on each of said pawls for contacting said armature when said magnet is energized, said contact serving to rotate the pawls as said pawls revolve with said rotating drum; switch means disposed adjacent to the periphery of said drum one pawl position in advance of said magnet, each of said pawls having an extended portion, which is moved, when the pawl is rotated on its own axis by said armature, into position to close said switch means at a predetermined time during the revolution of said drum; a resetting arm on each pawl; a reset bearing arm disposed on each pawl for contact with the resetting arm of a subsequent pawl; and means including said switch means for selectively energizing said magnet in response to a first rotated pawl, whereby a subsequent pawl is rotated and the resetting arm thereof will cause the first rotated pawl to be reset.

8. The device described in claim 5, in which each of said storage means is adapted to issue an additional output signal after a definite delay from the time of receiving an entry from its respective data receiving means, the delay being progressively greater in dependence upon the sequential position of the related data receiving means, and comprising means responsive to said storage means for translating the second output signal therefrom.

9. A machine controllable by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of record sensing means to sense the data manifested in said record card, said means being arranged in a line perpendicular to the motion of the card; a plurality of individually operable printing means, one for each of said rows, said means representing the data significance of the respective row and being arranged in a line parallel to the motion of the card in the same sequence as said rows; a plurality of data input means each adapted for response to a corresponding one of said sensing means; a plurality of storage means each responsive to a corresponding one of said data input means, each of said storage means being adapted to issue a data manifestation after a definite delay from the time of responding to said sensing means, the delay being different in each of said storage means; means responsive to the data manifestations issued by said storage means for selectively operating said printing means; storage sensing means to sense the significance of the data in said storage means; means responsive to said storage sensing means for selectively operating said data input means; and means for selecting between said record sensing means and said storage sensing means for operating said data input means.

10. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card whereby different data designations are sensed at different ones of a sequence of times recurring at regular intervals; a plurality of individually operable printing means, one for each of said rows, each of said means representing the data significance of the respective row, said printing means being arranged along the path of card motion in the same sequence as said rows; a group of storage elements for each sensing means, each element thereof corresponding to different ones of said data designations; means synchronous with said sequence of times for distributing said data designations to correct ones of said storage elements; means for developing data manifestations at times recurring at more frequent regular intervals; a plurality of data receiving means, one for each group of storage elements; a plurality of means each rendered effective by one of said storage element groups to translate selected ones of said manifestations corresponding to said data designations to the respectively corresponding one of said data receiving means; a plurality of delay means, one for each of said data receiving means, each of said data receiving means being adapted to respond to one of said data manifestations to enter a corresponding item of data into its related delay means, each of said delay means being adapted to issue an output signal after a definite delay from the time of receiving an entry from its respective data receiving means, the delay being progressively greater in dependence upon the sequential position of the related data receiving means; means responsive to said delay means for translating the different output signals therefrom to different ones of said printing means respectively corresponding to the data significance of said output signals; means for providing a data manifestation corresponding to the signal output from each said delay means but advanced in said data sequence therefrom; and means for selecting between said data manifestation providing means and said data translation means for sending data to said data receiving means.

11. A printer comprising: a printing means operable to print selected ones of a plurality of characters, the characters being identifiable by corresponding data designations; a storage means for storing data designations related to characters which are printable by said printing means, said storage means being adapted to issue different pairs of manifestations respectively corresponding to different ones of said printable characters; storage control means operable to store different selected data designations in said storage means; printer control means selectively operable by different data designations to operate said printing means so as to print corresponding characters; first means responsive to a first one of said pair of manifestations issued from said storage means for operating said printer control means; and second means responsive to a second one of said pair of manifestations issued from said storage means for operating said storage control means.

12. A printer comprising: a printing means operable to print selected ones of a plurality of characters, the characters being identifiable by corresponding data designations; a storage means for storing data designations related to characters which are printable by said printing means, said storage means being adapted to issue a first manifestation corresponding to the data designation stored therein and a second manifestation corresponding to data of designation different from that stored therein; storage control means operable to store different selected data designations in said storage means; printer control means selectively operable by manifestations of different data designations to operate said printing means so as to print corresponding characters; first means responsive to said first manifestation for operating said printer control means; and second means responsive to said second manifestation for operating said storage control means.

13. A data processing machine in which different data designations are manifested at corresponding ones of a sequence of times recurring at regular intervals, comprising: a plurality of individually operable printing means, one for each of said designations; a data input means adapted for response to said designations; storage means responsive to said data input means, said storage means being adapted to issue a data manifestation after a definite delay from the time of responding to said data input means; means responsive to the data manifestations issued by said storage means for selectively operating said printing means; means to sense the significance of the data in said storage means; and means responsive to said storage sensing means for selectively operating said data input means to change the designation stored in said storage means.

14. In a data processing machine in which different data designations are manifested at corresponding ones of a sequence of times recurring at regular intervals, the combination of a plurality of storage elements each corresponding to different ones of said data designations, input means to enter data into said storage elements, means to cyclically condition each of said storage elements to be responsive to said input means successively in a timed sequence, different ones of said storage elements being selected to store different data designations according to the time of entry of said data by said input means, a first means responsive to said storage elements for emitting data at times in said sequence corresponding to data of designation different from that stored by said elements, means to selectively transmit said emitted data to said input means, a plurality of printing means each operable to print a character corresponding to one of said designations, a second means responsive to said storage elements for emitting data corresponding to one of said designations, and control means responsive to said second means for selectively operating said printing means so as to print a character corrresponding to data stored by said elements.

15. A printer comprising a plurality of printing means each operable to print a corresponding character; a plurality of storage means, one corresponding to each of said printing means; means to selectively activate different ones of said storage means; each of said storage means, when activated, being operable to manifest the character corresponding to its related printing means; means responsive to activated ones of said storage means to sense the characters manifested thereby; means responsive to said storage means for selectively operating said printing means; and means responsive to said sensing means for selectively operating said activating means following the sensing of each activated storage means to activate a different one of said storage means than the one sensed.

16. A printer comprising: a printing means operable to print selected ones of a set of different characters; a storage means settable to a number of different conditions identified, respectively, with said different characters; storage control means operable to set said storage means selectively to said different conditions; printer control means responsive to said storage means for selectively operating said printing means to print different characters corresponding, respectively, to the different conditions to which said storage means is set; and means responsive to said storage means for operating said storage control means to set said storage means to different conditions, each dependent upon the preceding condition of said storage means.

References Cited in the file of this patent

UNITED STATES PATENTS

| | | |
|---|---|---|
| 2,168,763 | Daly et al. | Aug. 8, 1939 |
| 2,811,102 | Devol | Oct. 29, 1957 |
| 2,915,967 | Gehring et al. | Dec. 8, 1959 |

UNITED STATES PATENT OFFICE
CERTIFICATE OF CORRECTION

Patent No. 3,049,991 August 21, 1962

George A. Giannuzzi

It is hereby certified that error appears in the above numbered patent requiring correction and that the said Letters Patent should read as corrected below.

Column 3, line 67, for "down." read -- down, --; column 4, line 39, after "delayed" insert a comma; line 48, after "reading" insert -- rate --; column 5, line 26, for "impression." read -- impression, --; line 57, for "cycle" read -- subcycle --; column 8, line 71, for "This" read -- this --; column 13, line 47, for "RCG,..." read -- ...RCG, --; column 16, line 49, and column 17, line 7, for "cylically" read -- cyclically --; line 9, after "in" insert -- a --; line 31, for "isue" read -- issue --; line 56, for "in", second occurrence, read -- is --.

Signed and sealed this 19th day of March 1963.

(SEAL)

Attest:

ESTON G. JOHNSON
Attesting Officer

DAVID L. LADD
Commissioner of Patents